United States Patent [19]

Betchel et al.

[11] Patent Number: 5,074,726

[45] Date of Patent: Dec. 24, 1991

[54] BLIND FASTENER

[75] Inventors: Thomas S. Betchel, Norton; James D. MacGregor, Cuyahoga Falls; Ronald W. Phillips, II, Mogadore; James R. Shackelford, Cuyahoga Falls, all of Ohio

[73] Assignee: The B. F. Goodrich Company, Akron, Ohio

[21] Appl. No.: 276,840

[22] Filed: Nov. 28, 1988

[51] Int. Cl.$^5$ ............................................. F16B 13/04
[52] U.S. Cl. ......................................... 411/34; 411/38
[58] Field of Search ............................. 411/34–38, 411/84, 85, 103, 104, 108, 109, 111–113, 173, 182, 427, 965, 969

[56] References Cited

U.S. PATENT DOCUMENTS

| | | | |
|---|---|---|---|
| 2,409,352 | 10/1946 | Gill | 411/38 |
| 2,553,236 | 5/1951 | Bratfisch | 411/34 |
| 2,559,281 | 7/1951 | Croessant | 411/38 |
| 2,660,083 | 11/1953 | Tyson | 411/396 |
| 2,763,314 | 9/1956 | Gill | 411/34 |
| 3,131,743 | 5/1964 | Hinkle | 411/38 |
| 3,789,728 | 2/1974 | Shackelford | 411/34 |
| 4,007,659 | 2/1977 | Stencel | 411/34 |
| 4,036,098 | 7/1977 | Schruff | 411/34 |
| 4,266,460 | 5/1981 | Klimowicz | 411/397 |
| 4,464,091 | 8/1984 | Molina | 411/108 X |

FOREIGN PATENT DOCUMENTS

| | | | |
|---|---|---|---|
| 658776 | 10/1951 | United Kingdom | 411/427 |
| 2151741 | 7/1985 | United Kingdom | 411/34 |

Primary Examiner—Gary L. Smith
Assistant Examiner—Jerry Redman
Attorney, Agent, or Firm—Joseph Januszkiewicz

[57] ABSTRACT

A blind fastener that is installed from one side only of a hole in a plate structure wherein the blind fastener has a tubular body with a head and a sleeve loosely journaled in the central bore of the tubular body. The sleeve has an upper portion that is retained within the central bore and a lower portion larger in diameter than the upper portion presenting a shoulder that abuttingly engages the annular end of the tubular body. The sleeve is retained in position on the fastener by tabs extending from the tubular body through slots in the lower portion and extend radially to limit the axial movement of the sleeve. The central bore of the sleeve is threaded to receive a fastening bolt as well as the draw rod that effects the upsetting of the fastener.

3 Claims, 2 Drawing Sheets

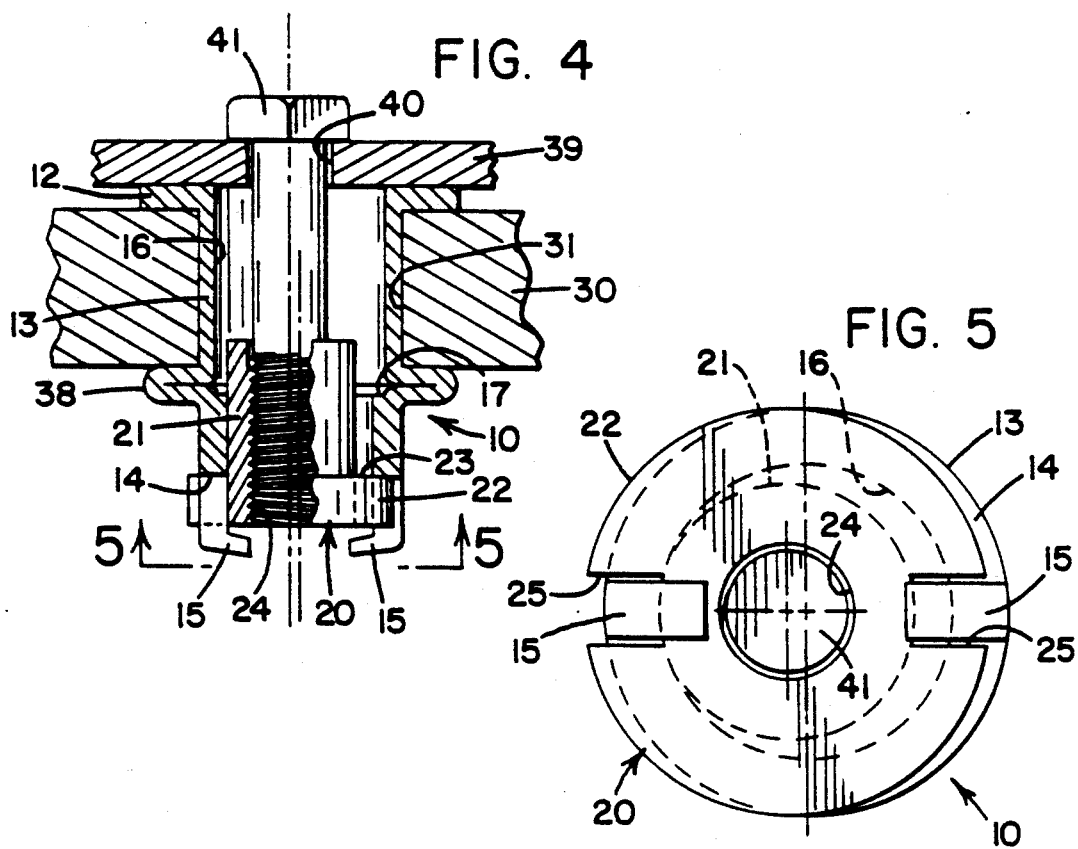
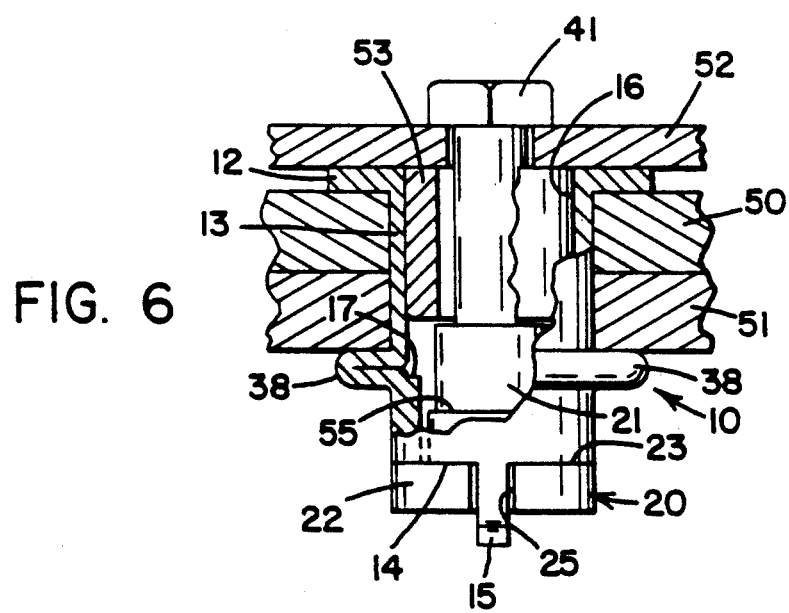

BLIND FASTENER

BACKGROUND

This invention relates to blind fasteners and more particularly to a blind fastener of the type that can be installed entirely from one side of a structure and has an insert threaded portion that cooperates with the main body of the fastener to provide a floating action to compensate for misalignment of Parts to be interconnected. Conventional blind fasteners have an internal screw thread that facilitates the upsetting action of a tubular body of the fastener, which upsetting action cooperates with the head of the fastener to secure the fastener in its position on the structure or plate members. It was important in these installations to locate the hole within the structure that receives the blind fastener precisely as any deviation from the intended installation hole would result in the need to provide either another hole for a second fastener or else adjust the product or member that was to be installed on the structure. The present invention provides a new and improved means for compensating for misalignment by having a threaded sleeve that is loosely journaled within the lower portion of the tubular portion of the fastener, which tubular portion is upset thereby securely locking the fastener in position on the structure while providing versatility to the fastener. With the loosely fitting threaded sleeve, sufficient clearance is obtainable in all directions to compensate for any slight misalignment of the fastener body thus increasing efficiency and versatility. The present construction is a material improvement over a self-aligning nut assembly such as illustrated by U.S. Pat. No. 2,553,236 since nut element with its short axial length contributes to false starts of the screw threads and the stripping thereof which renders the fastener useless as well as requiring the removal thereof. In addition, locking threads are often used in the fastener elements in the aircraft industry whereas the threaded element of the present invention provides non-locking threads that act as a guide so that the male threaded element may be easily engaged in the lower locking threads. The present invention is less costly to manufacture and permits the use of different size sleeves which can be assembled at the place of use prior to installation. With these combination of elements there is provided a fastener that is smaller for a given thread size than heretofore possible. In addition, the fastener, particularly the threaded sleeve, is easy to manufacture using techniques well known in the art. The shear strength of the fastener may be increased by the use of a shoulder bolt or a spacer to fill the counterbore area.

These type of fasteners are particularly useful in the aircraft industry where lightweight blind type fasteners are necessary.

SUMMARY OF THE INVENTION

This invention in its preferred embodiment is a two piece element fastener that is assembled into an integral blind fastener of the type that has a head and a tubular body. The tubular body is adapted to be passed through a hole in a structure or plate member and is capable of being upset or reshaped for engagement with the blind surface of the structure. The tubular body has a central bore and an annular edge opposite the head. A sleeve with a smaller external diameter than the diameter of the central bore is secured to the lower portion of the tubular body and freely floats in the central bore, with a flanged portion on such sleeve to engage the annular edge of the tubular body. The sleeve has an upper internal threaded bore portion for receiving the draw rod for an upsetting action on the tubular body and for receiving a bolt to fasten a plate to the structure. The flanged portion on the sleeve is used to facilitate upsetting action on the tubular body.

BRIEF DESCRIPTION OF THE DRAWINGS

FIG. 4 is a side elevational cross sectional view of the fastener secured to a structure with a bolt and plate secured to the fastener;

FIG. 5 is an enlarged view of the bottom portion of the fastener taken on line 5—5 of FIG. 4;

FIG. 6 is a side elevational view of the fastener in an upset condition with a portion broken away and part in cross-section showing a spacer in the central bore of fastener.

DESCRIPTION OF THE PREFERRED EMBODIMENT

Figure 1:
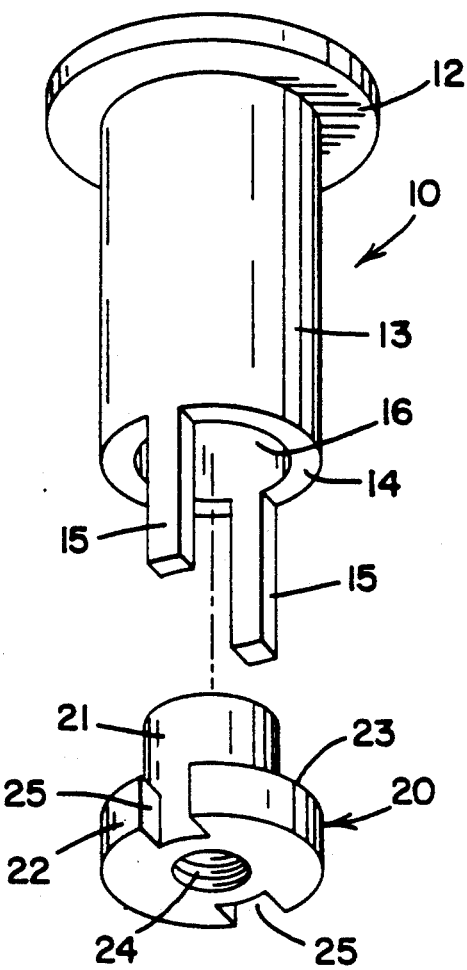
FIG. 1 is an exploded isometric view of a blind fastener.

Referring to the drawings wherein like reference numerals designate like or corresponding parts throughout the several views, there is shown in FIG. 1 a fastener 10. It is to be noted that the fasteners illustrated in the drawings are considerably larger than the actual size of the fastener to more clearly describe the invention. The fastener 10 has a thin flat head 12 and a longitudinally extending tubular or hollow cylindrical body 13 that terminates into an annular edge 14 with two (2) downwardly projecting tabs 15 which are to be bent for a purpose to be described. As seen in FIGS. 1 and 5, the tabs 15 are located diametrically opposite each other. Such tubular body 13 has a central bore 16. The upper and intermediate wall portion of tubular body 13 is thin walled in construction compared to the lower wall portion of tubular body 13 to facilitate an upsetting action to the thin walled portion. The junction of the thin walled portion with the thicker lower wall portion of tubular body 13 presents a shoulder 17 within central bore 16.

Loosely journaled in the central bore 16 of tubular body 13 is a longitudinally extending sleeve or insert 20 that has an upper (as viewed in FIGS. 1 and 2) portion 21 and a larger diameter lower cylindrical portion or flanged portion 22. The juncture of the upper portion 21 with the lower portion 22 presents a shoulder 23. Sleeve 20 has a longitudinally extending central bore 24 that is threaded for substantially the full length thereof. The lower cylindrical portion 22 of sleeve 20 has a pair of slots or recesses 25 on opposite sides thereof, which slots 25, as seen in FIG. 1, are in vertical alignment with tabs 15. As the sleeve 20 is moved into the central bore 16 of tubular body 13, tabs 15 enter into slots 25 and sleeve 20 is continued to move upward into the central bore until shoulder 23 on lower portion 22 comes into abutting contact with annular edge 14. Thereafter the ends of the respective tabs 15 are bent inwardly toward each other to captively retain the sleeve 20 within the central bore 16 of tubular cylindrical body 13.

Figure 2:
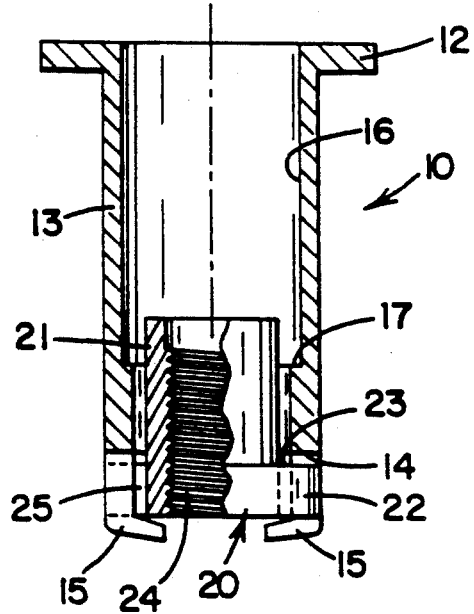
FIG. 2 is a side elevational view of the blind fastener as shown in FIG. 1 in cross section with a portion of the sleeve shown in full.

The upper portion 21 of sleeve 20 can be stepped slightly where the very upper section is of a slightly reduced diameter than the very lower section of upper portion 21 to permit greater tilting of the sleeve relative to the central bore 16. By making the upper portion of sleeve 20 longer, the operator is better able to center the bolt within the sleeve and properly thread such bolt into the threaded central bore 24. It is to be noted that the slots 25 extend into lower cylindrical portion 22 of sleeve 20 to present a surface substantially coextensive with the upper portion 21 as seen in FIGS. 2 and 3.

As seen in FIGS. 5 and 6, the width of tabs 15 is smaller than the width of slots 25 to provide sufficient clearance space to permit slight rotative movement of sleeve 20 relative to tubular body 13 to permit lateral and limited rotative movement therebetween. With the outside diameter of the upper portion 21 of sleeve 20 being substantially less than the inside diameter of the lower portion of central bore 16 of tubular body 13, sufficient clearance space is provided to permit the sleeve 20 to freely float in the central bore to compensate for misalignment of plates to be joined to the main support.

Figure 3:
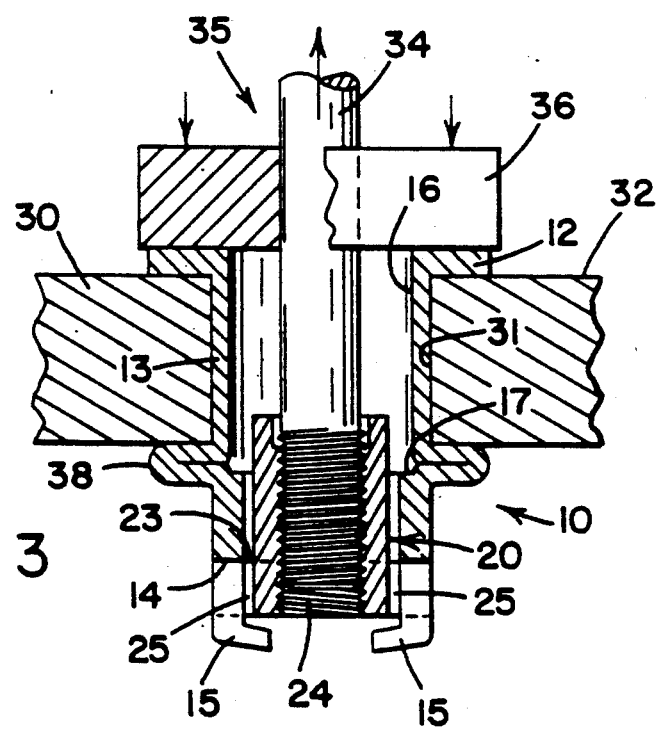
FIG. 3 is a side elevational cross sectional view of the fastener upset in a plate member or structure with a portion of the fastener broken away and showing a portion of a draw rod and anvil performing an upsetting action on the fastener.

To attach the fastener 10 to a structure or plate member 30, a hole 31 is drilled therethrough as illustrated in FIG. 3. Such hole 31 may be countersunk to accommodate a tapered head of the fastener 10 if desired. Fastener 10 is inserted into the hole 31 with the flanged head 12 resting on the top surface 32 of structure 30 and the shank or tubular body of the fastener 10 projecting out of the hole 31. A draw rod 34 of an upsetting tool 35 is threadedly connected to the threaded portion of the fastener 10 as illustrated in FIG. 3. A non-rotatable annular anvil 36 is drawn down over the rod 34 and has its lower surface in engagement or bearing against the top surface of the flanged head 12. As the rod 34 is moved upwardly (as viewed in FIG. 3), pressure is maintained on the anvil 36 and the continued upward movement of rod 34 has the shoulder 23 or annular flange 22 of sleeve 20 exert pressure on tubular body 13 effecting a buckling of the thin walled portion of tubular body 13 designated 38. Such buckling of 38 is applied against the blind surface of structure 30 thereby firmly securing the fastener on structure 30 between such buckled portion 38 and the head 12 of fastener 10. Although plate structure 30 is illustrated as relatively thick, such thickness is relative and the fastener described can be applied to a thin walled structure.

Once blind fastener 10 is secured to the structure or plate member 30, a product or thin sheet metal member 39 may be secured to the structure 30 by laying such plate member 39 onto structure 30 and have its predrilled hole 40 in alignment with hole 31 in structure 30 and thence screw threading a bolt 41 into the threaded bore 24 in sleeve 20. As can be seen in FIG. 4, the clearance space between the sleeve 20 and the tubular body 13 allows for misalignment of holes 40 and 31 to compensate for slight misalignment of parts wherein the operator does not have access to the blind side of structure 30. As seen in FIGS. 4 and 5, the clearance space between the sleeve 20 and the tubular body 13 has considerable latitude such that their respective longitudinal axes have sufficient off-set clearance.

FIG. 6 illustrates the interconnection of two plates 50 and 51 with a third plate 52 wherein any minor misalignment of plates can be compensated for by the floating action of bolt 41. In addition a sleeve 53 is shown as located within the central bore 16 of the tubular body 13 as a spacer and with a clearance space shown between tab 15 and the slot 25 in the lower portion of sleeve 20. The upper portion of the sleeve 20 is shown as stepped in construction, Presenting a shoulder 55 which permits a thin walled sleeve of harder metal to engage such shoulder to deform slightly the ductile metal of the inner threaded bore 24 at such shoulder 55 to provide a non-locking thread thereat to act as a guide so that the male threaded element or bolt 41 may be easily engaged in the threads below such shoulder 55, which threads are the locking threads. The clearance space between the upper portion 21 of sleeve 20 can provide tilting thereof within the central bore to compensate for misalignment and facilitates the mating of the screw threads.

It will be apparent that although a specific embodiment and certain modifications of the invention have been described in detail, the invention is not limited to the specifically illustrated and described construction since variations may be made without departing from the principles of the invention.

We claim:

1. A blind fastener consisting essentially of a head and a longitudinally extending tubular body which is integral with said head for attachment to a workpiece with a blind surface, said tubular body having an end portion remote from said head, said tubular body and said head having a central opening extending therethrough defining a central bore with a central axis extending longitudinally therethrough, said tubular body having a thin walled portion along its length to facilitate the outward protrusion as by an upsetting action to engage said blind surface, said end portion of said end portion, a longitudinally extending non-deformable sleeve journaled in said tubular body, said sleeve having an upper cylindrical portion and a lower cylindrical portion, said sleeve having a central threaded bore and an external outer surface, the juncture of said lower cylindrical portion with said upper cylindrical portion defines a shoulder on said outer surface, the internal diameter of said central bore of said tubular body being greater than the external diameter of said upper cylindrical portion of said sleeve to provide a clearance space therebetween which permits lateral movement therebetween, said lower portion of said sleeve having at least a pair of slots extending therethrough for receiving said tabs, said tabs being of greater length than the length of said slots, the terminal ends of said tabs project radially inwardly toward said central axis to captively secure said upper cylindrical portion within said central opening and place said shoulder into abutting contact with said annular end surface of said tubular body while permitting lateral movement and limited rotative movement of said sleeve within said tubular body, said slots in said lower portion being of greater circumferential width than the circumferential width of said tabs to provide circumferential clearance space therebetween to allow free floating play and rotation between said sleeve and said tubular body.

2. A blind fastener for insertion and upset in a workpiece with an aperture by operation from one side only of such workpiece wherein said blind fastener consists essentially of a tubular body having a flanged head at one end and an annular surface at the other end, said tubular body having a central bore with a central axis, said other end of said tubular body having a pair of tabs extending axially away from said tubular body with terminal end extending radially inwardly toward said axis of said central bore, said tubular body having a portion thereof outwardly extending to define a bulge for captively engaging said workpiece between said bulge and said flanged head, a longitudinally extending sleeve located in said central bore wherein said sleeve has an upper portion and a lower portion with a central threaded bore therethrough, said lower portion having a shoulder operative to abut said annular surface at said one end that provided an upsetting force on said tubular body, said lower portion having slots to receive said tabs and with said radially inwardly extending portions of said tabs retaining said longitudinal sleeve together with said tubular body and said upper portion of sleeve within said central bore of said tubular body, and the outside diameter of said upper portion of said sleeve being less than the inside diameter of said central bore of said tubular body providing a substantial clearance space therebetween that allows a lateral shifting of said sleeve relative to said tubular body, said slots in said lower portion being of greater circumferential width than the circumferential width of said tabs to provide circumferential movement and lateral shifting therebetween.

3. A blind fastener as set forth in claim 2 wherein the uppermost section of said upper portion of said sleeve has a smaller outside diameter than the lowermost section of said upper portion of said sleeve to provide a greater limited lateral play and tilting between said sleeve and said tubular body of said fastener.

* * * * *

UNITED STATES PATENT AND TRADEMARK OFFICE
CERTIFICATE OF CORRECTION

PATENT NO.   : 5,074,726
DATED        : 12/24/91
INVENTOR(S)  : THOMAS STEPHEN BETCHEL et al

It is certified that error appears in the above-identified patent and that said Letters Patent is hereby corrected as shown below:

Column 4, Claim 1, Line 36 –

After second occurrence of "said" and before second occurrence of "end", add --tubular body having an annular end surface, a pair of tabs depending downwardly from said--.

Signed and Sealed this

Twenty-fifth Day of May, 1993

Attest:

MICHAEL K. KIRK

Attesting Officer

Acting Commissioner of Patents and Trademarks